United States Patent
Karau et al.

(10) Patent No.: US 11,936,090 B2
(45) Date of Patent: Mar. 19, 2024

(54) WAVEGUIDE ASSEMBLY COMPRISING A DIELECTRIC WAVEGUIDE TRANSITION PIECE OF CHANGING SIZE LOCATED BETWEEN A FIRST WAVEGUIDE AND A SECOND DIELECTRIC WAVEGUIDE TO REDUCE HIGHER MODES

(71) Applicant: Rosenberger Hochfrequenztechnik GmbH & Co. KG, Fridolfing (DE)

(72) Inventors: Simon Karau, Stuttgart (DE); Andre Meyer, Bremen (DE); Martin Schneider, Menslage (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 235 days.

(21) Appl. No.: 17/299,502

(22) PCT Filed: Dec. 2, 2019

(86) PCT No.: PCT/EP2019/083323
§ 371 (c)(1),
(2) Date: Jun. 3, 2021

(87) PCT Pub. No.: WO2020/114973
PCT Pub. Date: Jun. 11, 2020

(65) Prior Publication Data
US 2022/0085477 A1    Mar. 17, 2022

(30) Foreign Application Priority Data
Dec. 4, 2018    (DE) .................... 10 2018 130 831.0

(51) Int. Cl.
*H01P 5/08*        (2006.01)
*F21V 8/00*        (2006.01)
(Continued)

(52) U.S. Cl.
CPC ............ *H01P 5/087* (2013.01); *G02B 6/0096* (2013.01); *G02B 6/264* (2013.01); *H01P 3/16* (2013.01); *H01P 5/024* (2013.01); *H01P 5/107* (2013.01)

(58) Field of Classification Search
CPC .......... H01P 5/087; H01P 3/16; H01P 11/006; H01P 5/024
(Continued)

(56) References Cited

U.S. PATENT DOCUMENTS 4,875,026 A * 10/1989 Walter et al. ............. H01P 3/16
                                                    333/251
5,067,789 A    11/1991 Hall
(Continued)

FOREIGN PATENT DOCUMENTS

| DE | 102008010171 A1 | 8/2009 |
| EP | 2161522 A1 | 3/2010 |
| WO | 2015000376 A1 | 1/2015 |

OTHER PUBLICATIONS

Office Action issued by the European Patent Office Action dated May 19, 2022.
(Continued)

*Primary Examiner* — Benny T Lee
(74) *Attorney, Agent, or Firm* — Randall Danskin P.S.

(57) ABSTRACT

A waveguide assembly comprising a first waveguide, and a second waveguide designed as a dielectric multimodal waveguide, and a waveguide transition for transmitting an electromagnetic wave between the first waveguide and the second waveguide, the waveguide transition having a dielectric waveguide piece which is between the first waveguide and the second waveguide. The dielectric waveguide piece
(Continued)

is capable of guiding a smaller mode number than the second waveguide, at least in a front section, facing the first waveguide.

21 Claims, 3 Drawing Sheets

(51) Int. Cl.
*G02B 6/26* (2006.01)
*H01P 3/16* (2006.01)
*H01P 5/02* (2006.01)
*H01P 5/107* (2006.01)

(58) Field of Classification Search
USPC .................................................. 333/21 R, 248
See application file for complete search history.

(56) References Cited

U.S. PATENT DOCUMENTS

| | | |
|---|---|---|
| 5,684,495 A | 11/1997 | Dyott |
| 6,469,676 B1 | 10/2002 | Fehrenbach |
| 9,478,842 B1 * | 10/2016 | Decrossas et al. ..... H01P 5/087 |
| 9,899,721 B2 | 2/2018 | Morgan |
| 2007/0081764 A1 | 4/2007 | Deliwala |
| 2007/0188396 A1 | 8/2007 | Griessbaum |
| 2009/0136176 A1 | 5/2009 | Kopp |
| 2015/0008993 A1 | 1/2015 | Chu |
| 2016/0036114 A1 | 2/2016 | Okada |

OTHER PUBLICATIONS

Letter to the EPO dated May 21, 2021.
Office Action issued by the State Intellectual Property Office of China dated Dec. 30, 2022.
German Search Report dated Feb. 7, 2019.

* cited by examiner

WAVEGUIDE ASSEMBLY COMPRISING A DIELECTRIC WAVEGUIDE TRANSITION PIECE OF CHANGING SIZE LOCATED BETWEEN A FIRST WAVEGUIDE AND A SECOND DIELECTRIC WAVEGUIDE TO REDUCE HIGHER MODES

CROSS REFERENCE TO RELATED APPLICATIONS

This Non-Provisional Patent Application is a United States National Stage Patent Application which claims the benefit of priority to earlier filed PCT Patent Application No, PCT/EP2019/083323, which was filed on 2 Dec. 2019. This United States National Stage Patent Application also claims the benefit of priority to earlier filed German Patent Application No, 10 2018 130 831.0, filed on 4 Dec. 2018. The earlier filed PCT Patent Application No. PCT/EP2019/083323 is published as WO 2020/114973 A1, and was published on 11 Jun. 2020. The entire contents of the aforementioned earlier filed PCT Patent Application and earlier filed German Patent Application are both expressly incorporated herein by this reference.

Pursuant to USPTO rules, this priority claim to earlier filed PCT Patent Application No. PCT/EP2019/083323, and to earlier filed German Patent Application No. 10 2018 130 831.0 is also included in the Application Data Sheet (ADS) filed herewith.

TECHNICAL FIELD

The invention relates to a waveguide assembly comprising a first waveguide, a second waveguide, which is embodied as a dielectric multi-mode waveguide, and a waveguide transition for transmitting an electromagnetic wave between the first waveguide and the second waveguide.

The invention also relates to a waveguide transition for transmitting an electromagnetic wave between a first waveguide and a second waveguide that is embodied as a dielectric multi-mode waveguide.

Furthermore, the invention relates to use of a waveguide assembly.

BACKGROUND

According to the current prior art, cable-based data transmission can be fundamentally divided into two different technologies. In this case, on the one hand data transmission by means of metal conductors is known and on the other hand optical data transmission by means of glass fibers is known.

It is known that signal transmission via conventional electrical conductors, such as for example copper cable in electrical cables, is subjected to intense signal damping in the case of high frequencies. Consequently, significant upfront monetary costs/expenses are sometimes necessary, particularly if high demands are placed on the transmission band width, in order to realize the specifications—if at all possible.

In contrast, optical data transmission is an extremely low-loss procedure and it can realize high data rates. However, optical data transmission always requires converting electrical signals into optical signals and conversely, which makes complex transmitting and receiving structures necessary in the case of this type of signal transmission.

In addition to the two conventional data transmission techniques, interest is growing in a technology which attempts to become established as an alternative. The present invention relates to the transmission of data via so-called dielectric waveguides (dielectric waveguides", DWG or "polymer microwave fibers", PMF).

In the case of this technique, the electrical signal of a carrier frequency is modulated, in particular in the upper gigahertz range (for example 80 GHz), and transmitted as an electromagnetic wave along the dielectric waveguide. In contrast to an optical method, the method does not require an electro-optical conversion. In comparison to metal waveguides, the concept has the advantage that dielectric waveguides make it possible to transmit extremely high data rates, for example in the region of 50 GB/s, at least over average distances, for example in the region of 10 m. Dielectric waveguides appear therefore in particular very interesting since an increasing number of the required semiconductor technologies has now become available for the high gigahertz range and render possible a cost-effective and high degree of integration, for example in the RF, CMOS technology.

Electromagnetic waves that propagate along a dielectric waveguide can occur depending upon the character of the waveguide in different field configurations. These different field configurations are referred to as "modes". If only the basic mode is run in a dielectric waveguide, this is referred to as a "single mode" waveguide in a similar manner to the glass fibers. Whereas if it is possible that the dielectric waveguide can run multiple modes simultaneously, this is referred to as a "multi-mode" waveguide. The number of modes that a dielectric waveguide is able to run depends fundamentally on the operating frequency and geometry of the waveguide, in particular on the size of its cross-sectional area (for example diameter of a circular waveguide) and on its permittivity (also referred to as dielectric permittivity).

As is also the case in conventional data transmission technologies, a critical component when designing the transmission medium is the dispersion caused by the transmission medium. Dispersion is referred to as being the characteristic of a waveguide according to which signals, or parts of signals of a different frequency, propagate at different speeds in the waveguide. Consequently, the dispersion is in addition to damping a significant parameter that can limit the maximal achievable data rate. In the case of the dielectric waveguide, the dispersion can be divided into two different types: the waveguide dispersion, and the modal dispersion.

The waveguide dispersion describes the dispersion of the basic mode in which data are generally transmitted and occurs both in single mode waveguides as well as in multi-mode waveguides.

In contrast, the modal dispersion relates to the different propagation speeds of the individual modes. If higher modes are excited at the transition to the dielectric waveguide or along the conductor by virtue of discontinuities, it is possible in the case of data transmission for a reduction in the usable power to occur and for signals to become distorted as a result of which the maximal achievable data rate can be limited.

Multi-mode waveguides can have a lower waveguide dispersion than single mode waveguides but they can lose this advantage as a result of possible modal dispersion. This is particularly problematic if undesired modes are excited to an excessively high degree either by means of the transition from the transmitter or the receiver to the dielectric waveguide, or by means of discontinuities along the waveguide.

The object of the present invention is to provide an improved waveguide assembly, in particular to provide a waveguide assembly that has reduced modal dispersion.

It is also the object of the present invention to provide an improved waveguide transition, in which in particular it is possible to avoid the excitation of higher modes in the case of a transition to a dielectric multi-mode waveguide.

Moreover, the object of the invention is to provide an advantageous use of a waveguide assembly.

The object is achieved for the waveguide assembly, for the waveguide transition and for use of a waveguide assembly by means of the disclosures herein, including the claims.

In accordance with the invention, a waveguide assembly is proposed comprising a first waveguide, a second dielectric multi-mode waveguide, and a waveguide transition for transmitting an electromagnetic wave between the first waveguide and the second waveguide.

An "electromagnetic wave" within the scope of the invention is intended to mean an electromagnetic wave that does not lie within the light spectrum that is used for an optical signal transmission.

The invention is particularly suitable for transmitting an electromagnetic wave in the millimeter range (30 GHz to 300 GHz) and sub-millimeter range (300 GHz to 3 THz).

The transmission direction of the electromagnetic wave is not important within the scope of the invention. The electromagnetic wave can consequently be fed into the second waveguide starting from the first waveguide via the waveguide transition—or conversely. A bi-directional transmission within the scope of the invention is also possible. Insofar as reference is made to a transmission of the electromagnetic wave from the first waveguide into the second waveguide, such a reference is only to be attributed to the simplified description of the invention and is not to be understood as limiting.

It is preferred that the second waveguide is embodied as a dielectric hollow conductor. The second waveguide can have, in particular, a circular cross-section. It is preferred that the second waveguide is embodied as a round dielectric hollow conductor.

The waveguide transition of the waveguide assembly, in accordance with the invention, comprises a dielectric waveguide piece that is arranged between the first waveguide and the second waveguide in order to transmit the electromagnetic wave between the first waveguide and the second waveguide by means of the dielectric waveguide piece.

It is preferred that the dielectric waveguide piece is a component that is embodied separately from the first waveguide and/or from the second waveguide.

The dielectric waveguide piece is embodied, in accordance with the invention, in order to run a lower number of modes at least in a front section, that is facing the first waveguide, than the second waveguide is able to run.

The invention consequently relates to an improved transition from any desired waveguide, for example a coaxial cable, a single wire waveguide, a metal or dielectric hollow conductor or a strip conductor, to a dielectric multi-mode waveguide.

Insofar as the second waveguide comprises different field configurations along its longitudinal axis, for example in a first region the dielectric waveguide piece is able to run a first maximal number of modes and in a second region the dielectric waveguide piece is able to run a second maximal number of modes that is different from the first maximal number of modes, it is provided within the scope of the invention that the dielectric waveguide piece is embodied in order to run a lower number of modes in its front section than the second waveguide is able to run in the front region that is facing the dielectric waveguide piece. As used herein, the term "run" is to be understood to mean propagating a mode therethrough or passing/conducting a mode therethrough.

By virtue of the fact that the dielectric waveguide piece is able to run only a lower number of modes in its front section than the second waveguide, it is possible to avoid, or at least greatly reduce, the excitation of undesired modes which occurs in the case of the transition of any desired waveguide to a waveguide that is able to run multiple modes, with the result that the resultant modal dispersion and its negative effects on the data transmission can be practically ignored. In accordance with the invention, the excitation of higher modes in the case of the transition of the electromagnetic wave from the first waveguide into the second waveguide can be suppressed by means of the waveguide transition that is arranged between them.

In one advantageous development of the invention, it is possible to provide that the dielectric waveguide piece is a "purely dielectric waveguide piece", in particular without a metal or another other conductive border.

Consequently, within the scope of the conventional technical definition the dielectric waveguide piece can preferably be a waveguide in which the electromagnetic wave is guided merely by virtue of the difference of the permittivities of two dielectrics (in particular of a dielectric solid body that forms the dielectric waveguide piece, and the air that surrounds the solid body or another gas).

It is preferred in terms of the invention not to design the electrical waveguide piece as a dielectric solid body within a metal border since such a structure in accordance with the conventional technical definition within the scope of the invention is preferably to be understood as a "dielectrically filled hollow conductor."

It is possible to provide that the front section of the dielectric waveguide piece is embodied as a single mode waveguide.

It is preferred that the front section of the dielectric waveguide piece is consequently embodied merely to transmit the basic mode. This renders the front section of the dielectric waveguide piece to completely avoid feeding in higher modes in the case of the transition from the first waveguide into the dielectric waveguide piece. However, it can already be advantageous within the scope of the invention if the front section of the dielectric waveguide piece is able to run any other low number of modes that are not regarded as being critical for a given application, for example two, three, four, five or six modes.

It is possible by virtue of avoiding the excitation of undesired higher modes to considerably reduce the modal dispersion in the multi-mode waveguide. Moreover, it is possible to increase the power that is fed into the modes that are provided for the actual transmission and to realize an almost identical customization at both inputs of the waveguide transition.

The term "higher modes" is to be understood in this case to mean all the modes whose respective limit frequencies are above the limit frequency of the mode in which the data are to be transmitted. It is preferred that the data are transmitted in the basic mode, where appropriate in different polarizations.

In accordance with the invention, it is for the first time advantageously possible by virtue of using the waveguide transition to use a multi-mode waveguide or a transmission system having multi-mode fibers for transmitting an electromagnetic wave, the transmission system having fundamentally better transmission characteristics than a transmission system having single mode fibers since the modal dispersion can be sufficiently suppressed in accordance with the invention.

In the invention, it is possible to provide that the front section of the dielectric waveguide piece has a reduced cross-section with respect to the second waveguide, a reduced permittivity of a dielectric core material with respect to the second waveguide and/or an increased permittivity of a sheath, which encases the dielectric core material, with respect to the second waveguide.

The term "core material" is intended to mean, in the present case, the material of the dielectric waveguide piece that is encased by the sheath.

By virtue of the disclosed possibilities, it is possible to advantageously provide the maximal number of transmissible modes in the front section of the dielectric waveguide piece, in particular with regard to the second waveguide.

A suitable possibility for reducing the number of modes of the dielectric waveguide piece that can be run is in particular a modification of the geometry with respect to the second waveguide. In particular, it is possible to reduce the cross-section area of the dielectric waveguide piece with respect to the cross-section area of the second waveguide, as a result of which the dielectric waveguide piece is able to run a lower number of modes than the second waveguide.

In particular, it is also possible to provide any desired combination of different geometries with a change of the permittivity of the dielectric waveguide piece and/or of the materials (sheath) that surround the dielectric waveguide piece. This renders it possible to increase the degree of freedom during the design procedure both with respect to the mechanical stability, the producibility and also with regard to the selection of material.

The core of the dielectric waveguide piece can have overall, or at least in its front section for example, a relative permittivity of 1.8 to 6.0 preferably 2.0 to 3.0.

The sheath of the dielectric waveguide piece can have for example a relative permittivity of 1.0 to 3.0, preferably 1.0 to 2.0.

The dielectric waveguide piece can be embodied for example fundamentally from polyethylene or polytetrafluoroethylene. The dielectric waveguide piece can also be embodied fundamentally from polystyrene, which can be of advantage in particular due to its good processing characteristics.

The dielectric waveguide piece can be embodied fundamentally exclusively from the section referred to as the "front section". However, it is also possible to provide that the dielectric waveguide piece comprises a rear section. It is preferred that the rear section can be embodied so as to run a higher number of modes than the front section of the dielectric waveguide piece.

The rear section of the dielectric wave guide piece can in this case be preferably designed in such a manner that the excitation of higher modes in the case of the transition between the rear section of the dielectric waveguide piece to the second waveguide is as low as possible.

It is possible that the diameter of the dielectric waveguide piece increases in size in the direction of the second waveguide, in particular starting from the front section of the dielectric waveguide piece to the rear section of the dielectric waveguide piece.

In the invention, it is possible in particular that the rear section of the dielectric waveguide piece forms a transition between different geometries and/or permittivities (of the core or sheath) of the front section of the dielectric waveguide piece and of the second waveguide.

By virtue of a corresponding transition, it is possible to realize a suitable customization of the dielectric waveguide piece for transmitting the electromagnetic wave between the first and the second waveguide.

It is possible to provide by virtue of correspondingly customizing the dielectric wave guide piece in the case of the transmission of the electromagnetic wave in the second waveguide to purposefully excite a desired mode in the second waveguide.

The sheath of the dielectric waveguide piece can have for example a relative permittivity of 1.0 to 3.0, preferably 1.0 to 2.0, in its rear section.

It is also possible to provide a suitable transition between the front section of the dielectric waveguide piece and the second waveguide alternatively or in addition to a rear section of the waveguide piece by means of a transition piece that is separate from the waveguide piece and is arranged between the waveguide piece and the second waveguide. The features described herein that relate to the rear section of the waveguide piece can accordingly also be understood with regard to the separate transition piece.

The axial length of the front section, and of the rear section, of the dielectric waveguide piece or of the front section of the dielectric waveguide piece and of the separate transition piece can be different.

Furthermore, it is possible to provide that the rear section (and/or the separate transition piece) can form a continuous, continuous in sections or discretely stepped transition.

Within the scope of a transition that is continuous in sections, it is possible in particular to provide that one or multiple staggered transitions of a geometric type and/or of physical material characteristics are introduced for example in a middle region of the rear section of the dielectric waveguide.

Furthermore, it is possible to provide that the rear section (and/or the separate transition piece) form a linear transition, an exponential transition and/or a transition in accordance with a monotone section of a cosine function.

A linear transition, an exponential transition and/or a transition in accordance with a monotone section of a cosine function is suitable in particular as a continuous transition or a transition that is continuous in sections between different geometries, for example different cross-section areas of the front and rear section of the dielectric waveguide.

For example, the rear section of the waveguide piece or the separate waveguide piece can have a change of the outer radius that extends along the longitudinal axis, follows a monotone section of a cosine function or is linear and consequently can form a transition from a smaller outer radius of the front section of the waveguide piece to a larger radius of the second waveguide.

Furthermore, it is possible to provide that the rear section (and/or the separate transition piece) forms a stepped transition in the form of steps of the length of an integer multiple of a quarter to a half of the guided wavelength of the electromagnetic wave in the case of the center frequency of a signal that is to be transmitted.

Such a stepped transition can be suitable in particular as a transition between different geometries, for example different cross-section areas of the front and rear section of the dielectric waveguide piece.

For example, the rear section of the waveguide piece or the separate waveguide piece can have a stepped change of the outer radius that extends along the longitudinal axis and consequently can form a transition from a smaller outer radius of the front section of the waveguide piece to a larger radius of the second waveguide.

It is possible in the invention to provide that a transition is formed between different permittivities by means of, modifying the density of the material and/or combining different materials in the rear section of the dielectric waveguide piece (and/or the separate transition piece).

It is consequently possible for the permittivities of the core and/or the sheath or their relationship to merge into one another continuously, continuously in sections or discretely from the front section of the waveguide piece to the rear end of the waveguide piece (and/or to the separate transition piece).

Within the scope of the compounding procedure (mixing different materials), it is possible for example to use polymer alloys, a polyblend or to dope the materials. It is possible to modify the density of the dielectric waveguide piece for example by means of compressing, foaming or different crystallization procedures.

Finally, it is also possible to geometrically assemble or combining multiple materials that in each case have different permittivities and finally overall form the dielectric waveguide piece, one of the sections of the dielectric waveguide piece and/or the separate transition piece. It is possible in this case to provide in particular a discretely stepped transition between the permittivities of the front section and of the rear section of the dielectric waveguide piece.

Moreover, it is possible to provide that the rear section of the dielectric waveguide piece and a front region of the second waveguide are embodied in order to allow their dielectric cores and/or their sheaths that encase the dielectric cores to geometrically merge into one another.

It is possible in the above-mentioned manner to realize a particularly suitable customization in the case of the transmission of the electromagnetic wave.

It is possible in particular to provide that the dielectric waveguide piece and the second waveguide having in each case different permittivities are allowed to geometrically merge into one another. In this case, it is in particular possible to provide that the dielectric cores and/or the sheaths that surround the dielectric cores of the dielectric waveguide piece and of the second waveguide are allowed to geometrically merge into one another.

It is possible to provide that the dielectric waveguide piece is embodied as a rectangular or round dielectric hollow conductor.

The dielectric waveguide piece can have in particular a circular cross-section. It is preferred that the dielectric waveguide piece is embodied as a round dielectric hollow conductor.

Furthermore, it is possible to provide that a part transition is arranged between the first waveguide and the dielectric waveguide piece.

A corresponding part transition can be in particular of advantage if the first wave guide is not a dielectric waveguide. The part transition can be embodied in this case to introduce the electromagnetic wave starting from the first waveguide into the dielectric waveguide piece or into its front section, rear section and/or into the separate transition piece.

It is possible to provide in particular that the part transition is embodied as a hollow conductor horn, or patch antenna, of an electrical printed circuit board.

The part transition can fundamentally be embodied as a separate component. However, it is possible to also provide that the part transition is embodied as one piece with the dielectric waveguide piece.

Since the direct excitation of the second waveguide by means of the part transition, in particular a hollow conductor horn, would lead to an intense excitation of higher modes in the second waveguide, the dielectric waveguide piece can be advantageous in accordance with the invention in particular if the dielectric waveguide piece is embodied as a dielectric single mode waveguide piece, it is consequently possible to prevent an excitation of higher modes in the case of the transition from the first waveguide. The subsequent transition from the dielectric waveguide piece to the second waveguide consequently excites only a very small number of higher modes.

The part transition can overlap the front section of the waveguide piece (and where appropriate at least in part also overlap its rear section) with regard to its function.

It is possible in one configuration of the invention to provide for example that the modes of the dielectric waveguide piece also have in addition to the dielectric guide facility a subordinate conductive guide facility, for example by means of a conductive border of the dielectric conductor. It is possible in this manner for the rear section of the waveguide piece to convert the modes of the dielectric waveguide piece already into the modes of the second waveguide while the dielectric waveguide piece is still excited by the part transition or by the first waveguide. It is possible in this manner to form the above-mentioned overlapping region. One example can be a transition from a first waveguide that is embodied as a hollow conductor into a dielectric multi-mode waveguide, wherein a hollow conductor horn forms the part transition and the rear section of the dielectric waveguide piece still starts in the hollow conductor horn.

It is possible to provide that the first waveguide is embodied as a coaxial cable, as a single wire waveguide, as a metal or dielectric hollow conductor or as a strip conductor.

The first waveguide can be embodied for example as a rectangular hollow conductor through an optional part transition that is arranged between the first waveguide and the dielectric waveguide piece excites the basic mode in the dielectric waveguide piece.

However, it is fundamentally possible for the first waveguide to be embodied as any desired waveguide for transmitting an electromagnetic wave.

The sheath of the second waveguide can have for example a relative permittivity of 1.0 to 3.0, preferably 1.0 to 2.0, in its rear section. The second waveguide can be embodied for example from polyethylene, polytetrafluoroethylene or polystyrene.

The second waveguides can have for example a circular cross-section. A dielectric waveguide of this type is fundamentally able to run higher modes insofar as the dielectric waveguide comprises a minimal waveguide dispersion. However, the invention is not to be understood to be limited to the use of a specific cross-section or a specific geometry of the dielectric multi-mode waveguide. It is also possible for example to provide rectangular or elliptic waveguides.

The dielectric waveguide piece and the second waveguide are preferably not identical and have different geometries. The dielectric waveguide piece and the second waveguide can however also have—at least in sections—identical geometries.

The optional part transition between the first waveguide and the dielectric waveguide piece, the dielectric waveguide piece or the front section and/or rear section or the separate transition piece can have any desired length and can be embodied as one piece or multi-piece in any desired combinations.

The invention also relates to a waveguide transition for a waveguide assembly that is described herein for transmitting an electromagnetic wave between a first waveguide and a second waveguide that is embodied as a dielectric multi-mode waveguide. The waveguide transition comprises a dielectric waveguide piece that is arranged between the first waveguide and the second waveguide. Moreover, the dielectric waveguide piece is embodied in order to run a lower number of modes at least in a front section, that is facing the first waveguide, than the second waveguide is able to run.

It is possible in accordance with the invention for an input signal to be introduced from the first waveguide consequently not directly into the dielectric multi-mode waveguide but rather the input signal can initially be transmitted by means of the waveguide transition in accordance with the invention. In this case, the electromagnetic wave is initially introduced into a modified dielectric wave guide, referred to within the scope of the invention as a "dielectric waveguide piece", which is only able to run a reduced number of modes.

The dielectric waveguide piece is preferably to be selected such that the higher modes are not run within the dielectric waveguide, in particular not in the front section of the dielectric waveguide piece. It is possible to provide for this purpose a single mode waveguide piece.

In accordance with the invention, it is possible by means of the waveguide transition to avoid or at least greatly reduce the excitation of higher modes by means of the transition from the first wave guide to the second wave guide, whereby a multi-mode transmission by means of the second waveguide can be used without the disadvantages of a modal dispersion.

In addition to the advantages already mentioned within the scope of the waveguide assembly in accordance with the invention, it is a further advantage of the invention that by virtue of avoiding the excitation of higher modes at the transition to the dielectric waveguide it is possible to realize a higher degree of freedom with respect to the design of the waveguide, since it is only of minor importance to take into consideration the modal dispersion.

Moreover, the invention relates to use of a waveguide assembly for transmitting data by means of electromagnetic waves or for use in measurement technology, in particular for use in terahertz spectroscopy.

The use of a waveguide transition to avoid the excitation of higher modes is not exclusively advantageous in the case of data transmission but rather can also be used in other fields, such as for example in measurement technology. The invention is consequently not to be understood as a special and exclusive solution for dielectric waveguides for transmitting data but rather can also be used advantageously in other application areas of dielectric waveguides, such as for example for use in terahertz spectroscopy.

It is possible to provide that the waveguide transition is embodied exclusively from the dielectric waveguide piece and is embodied optionally from the transition piece and/or the part transition. It is preferred that the waveguide transition does not comprise at least one hollow conductor, in particular does not comprise a dialectically filled hollow conductor.

Features that have already been described in connection with the waveguide assembly in accordance with the invention can naturally also advantageously be used for the waveguide transition in accordance with the invention or the described application—and conversely. Moreover, advantages that have already been mentioned in connection with the waveguide assembly in accordance with the invention can naturally also be understood with regard to the waveguide transition in accordance with the invention or to the application—and conversely.

In addition, reference is made to the fact that terms such as "including", "comprising" or "having" do not exclude other features or steps. Moreover, terms such as "a" or "the" that refer to a single number of steps or features do not exclude multiple steps or features—and conversely.

Exemplary embodiments of the invention are explained in detail below with reference to the accompanying FIGURES.

SUMMARY OF THE INVENTION

A principal aspect of the present invention is a waveguide assembly comprising a first waveguide, a second waveguide that is embodied as a dielectric multi-mode waveguide, preferably as a dielectric hollow conductor, and a waveguide transition for transmitting an electromagnetic wave between the first waveguide and the second waveguide, comprising a dielectric waveguide piece that is arranged between the first waveguide and the second waveguide, wherein the dielectric waveguide piece is embodied in order to be able to run a lower number of modes at least in a front section that is facing the first waveguide than the second waveguide.

A further aspect of the present invention is a waveguide assembly, characterized in that the dielectric waveguide piece is a purely dielectric waveguide piece.

A further aspect of the present invention is a waveguide assembly, characterized in that the front section of the dielectric waveguide piece is embodied as a single mode waveguide.

A further aspect of the present invention is a waveguide assembly, characterized in that the front section of the dielectric waveguide piece has a reduced cross-section with respect to the second waveguide, a reduced permittivity of a dielectric core material with respect to the second waveguide and/or an increased permittivity of a sheath, which encases the dielectric core material, with respect to the second waveguide.

A further aspect of the present invention is a waveguide assembly, characterized in that the dielectric waveguide piece comprises a rear section that is facing the second waveguide and forms a transition between different geometries and/or permittivities of the front section of the dielectric waveguide piece and of the second waveguide.

A further aspect of the present invention is a waveguide assembly, characterized in that the rear section forms a continuous, continuous in sections or discretely stepped transition.

A further aspect of the present invention is a waveguide assembly, characterized in that the rear section forms a linear transition, an exponential transition and/or a transition in accordance with a monotone section of a cosine function.

A further aspect of the present invention is a waveguide assembly, characterized in that the rear section forms a stepped transition in the form of steps of the length of an integer multiple of a quarter to the half of the guided wavelength of the electromagnetic wave in the case of the center frequency of a signal that is to be transmitted.

A further aspect of the present invention is a waveguide assembly, characterized in that a transition is formed between different permittivities by, modifying the density of the material and/or combining different materials in the rear section of the dielectric waveguide piece.

A further aspect of the present invention is a waveguide assembly, characterized in that the rear section of the dielectric waveguide piece and a front region of the second waveguide are embodied in order to allow their dielectric cores and/or their sheaths that encase the dielectric cores to geometrically merge into one another.

A further aspect of the present invention is a waveguide assembly, characterized in that the dielectric waveguide piece is embodied as a rectangular or round dielectric hollow conductor.

A further aspect of the present invention is a waveguide assembly, characterized in that a part transition is arranged between the first waveguide and the dielectric waveguide piece.

A further aspect of the present invention is a waveguide assembly, characterized in that the part transition is embodied as a hollow conductor horn or patch antenna of an electrical printed circuit board.

A further aspect of the present invention is a waveguide assembly, characterized in that the part transition is embodied as one piece with the dielectric waveguide piece.

A further aspect of the present invention is a waveguide assembly, characterized in that the first waveguide is embodied as a coaxial cable, as a single wire waveguide, as a metal or dielectric hollow conductor or as a strip conductor.

A still further aspect of the present invention is a waveguide transition for a waveguide assembly for transmitting an electromagnetic wave between the first waveguide and a second waveguide that is embodied as a dielectric multi-mode waveguide, comprising a dielectric waveguide piece that is arranged between the first waveguide and the second waveguide, wherein the dielectric waveguide piece is embodied in order to be able to run a lower number of modes at least in a front section that is facing the first waveguide than the second waveguide.

An even still further aspect of the present invention is a use of a waveguide assembly for transmitting data by means of electromagnetic waves or for use in measurement technology, in particular for use in terahertz spectroscopy.

These and other aspects of the present invention are disclosed herein.

The Figures illustrate in each case preferred exemplary embodiments in which individual features of the present invention are represented in combination with one another. Features of an exemplary embodiment can also be used separately from the other features of the same exemplary embodiment and can accordingly be readily combined by a person skilled in the art to form further expedient combinations and sub-combinations having features of other exemplary embodiments.

Like-functioning elements are provided with the same reference numerals in the detailed description of the figures.

BRIEF DESCRIPTIONS OF THE DRAWINGS

DETAILED DESCRIPTION OF THE PREFERRED EMBODIMENTS

This disclosure of the invention is submitted in furtherance of the Constitutional purposes of the US Patent Laws "to promote the progress of science and useful arts" (Article 1, Section 8).

Figure 1:
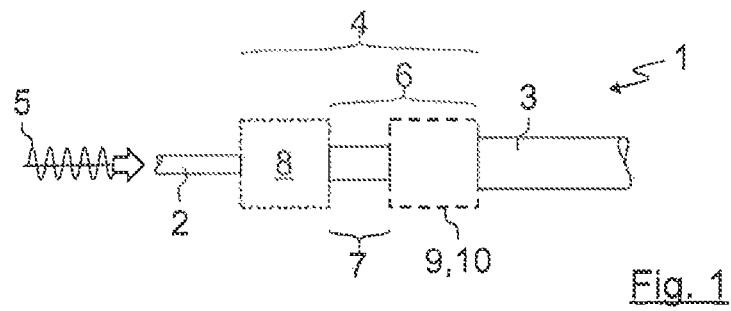
FIG. 1 illustrates a waveguide assembly in accordance with the invention having a first waveguide, a waveguide transition and a second waveguide.

FIG. 1 illustrates schematically a waveguide assembly 1 in accordance with the invention. The waveguide assembly 1 comprises a first waveguide 2, a second waveguide 3 and a waveguide transition 4 for transmitting an electromagnetic wave 5 between the first waveguide 2 and the second waveguide 3.

The first waveguide 2 can be embodied as any desired waveguide. The first waveguide 2 can consequently be embodied for example as a coaxial cable, as a single wire waveguide, as a metal or dielectric hollow conductor or as a strip conductor.

Figure 9:
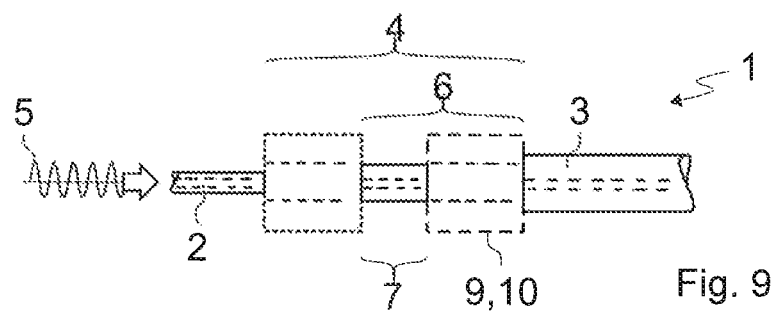
FIG. 9 illustrates the waveguide assembly having a hollow first waveguide, a hollow second waveguide and a dielectric hollow conductor.

The second waveguide 3 is embodied as a dielectric multi-mode waveguide and preferably as a dielectric hollow conductor as shown in FIG. 9.

The waveguide transition 4 comprises a dielectric waveguide piece 6 that is arranged between the first waveguide 2 and the second waveguide 3, wherein the dielectric waveguide piece 6 is embodied in order to run a lower number of modes in a front section 7 that is facing the first waveguide 2 than the second waveguide 3 is able to run.

It is preferred that the front section 7 of the waveguide piece 6 is embodied as a single mode waveguide.

In order to transmit the electromagnetic wave 5 between the first waveguide 2 and the dielectric waveguide piece 6 in the exemplary embodiments, a part transition 8 is arranged between the first waveguide 2 and the dielectric waveguide piece 6, The part transition 8 can be embodied with the dielectric waveguide piece 6 as one piece or multi-piece and is indicated merely schematically as a box in the exemplary embodiment. The part transition 8 can be embodied for example as a hollow conductor horn or patch antenna of an electrical printed circuit board. The part transition 8 can also overlap with the front section 7 and/or with the rear section 9 of the dielectric waveguide piece 6, the rear section 9 is still to be described.

Figure 2:
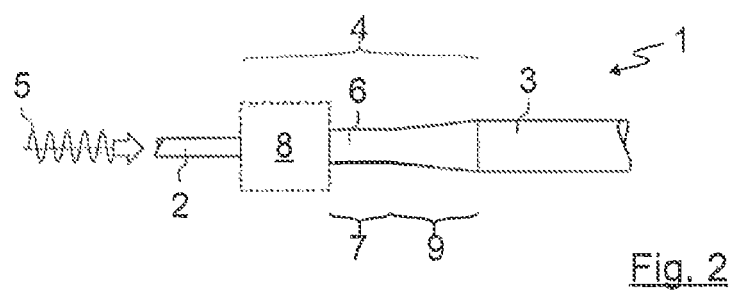
FIG. 2 illustrates a waveguide assembly in accordance with the invention having a waveguide transition in accordance with a first variant.

In order with respect to the second waveguide 3 or at least a front region of the second waveguide 3 that is facing the dielectric waveguide piece 6 to run a lower number of modes, it is possible for the front section 7 of the waveguide piece 6 to have a reduced cross-section with respect to the second waveguide 3 (See FIG. 1 and FIG. 2). Alternatively, or in addition thereto, the waveguide piece 6 can also have a reduced permittivity of its dielectric core material with respect to the second waveguide 3 (indicated by the hatchings in FIG. 3) and/or an increased permittivity of a sheath that encases the dielectric core material with respect to the second waveguide 3 (See FIG. 6).

For the sake of overview, FIGS. 1 to 5 illustrate in each case only the cores of the dielectric waveguide 3 and of the dielectric waveguide piece 6. The sheaths (See FIGS. 6 to 8) are not illustrated.

The dielectric waveguide piece 6 can also be embodied as a rectangular or round dielectric hollow conductor.

The dielectric waveguide piece 6 can comprise a rear section 9 that is facing the second waveguide 3 and forms a transition between different geometries and/or permittivities of the front section 7 of the waveguide piece 6 and of the second waveguide 3. Alternatively, it is possible to provide a transition piece 10 that is separate from the waveguide piece 6. For this purpose, FIG. 1 illustrates in a simplified manner initially only a box, the further figures illustrate different variants of the rear section 9 of the waveguide piece 6.

FIG. 2 illustrates a waveguide assembly 1 having a waveguide transition 4, the dielectric waveguide piece 6 of which has in its front section 7 a reduced cross-section in comparison to the second waveguide 3, and the rear section 9 of the waveguide transition 4 forms a transition to the enlarged cross-section of the second waveguide 3. The transition of the rear section 9 extends in this case continuously in a linear manner starting from the front section 7 in the direction of the second waveguide 3. It is fundamentally possible for the transition to extend in the rear section 9 in a linear, exponential and/or cosine-shaped manner (in other words following the monotone section of a cosine function) or in any other manner. The transition that is formed by the rear section 9 can be embodied in a continuous manner, as illustrated, but also can be embodied only continuous in sections or in a discretely stepped manner.

It should be further emphasized that the dielectric waveguide piece 6 and the part transition 8 can also be embodied as one piece between the first waveguide 2 and the dielectric waveguide piece 6 and can merge into one another. The waveguide piece 6 that is embodied in FIG. 2 as a core cross-section that changes can also be part of the part transition 8 if the part transition 9 is embodied for example as a metal hollow conductor horn.

Figure 3:
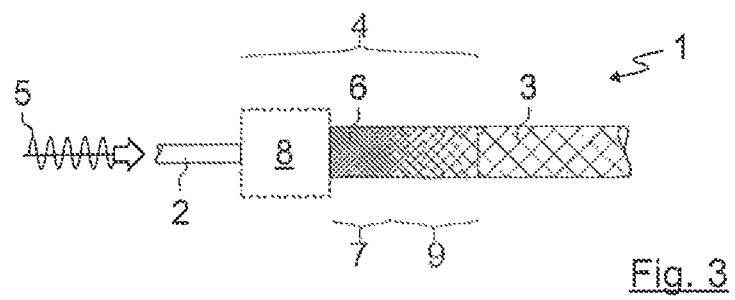
FIG. 3 illustrates a waveguide assembly in accordance with the invention having a waveguide transition in accordance with a second variant.
Figure 4:
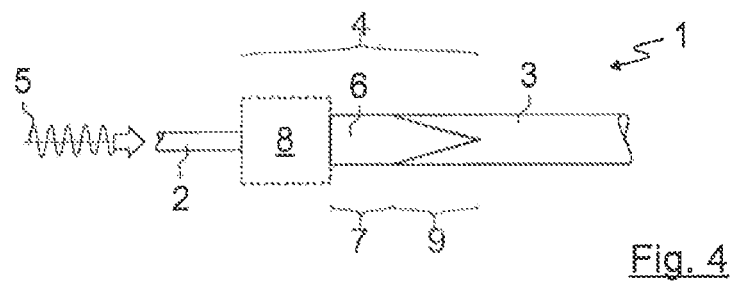
FIG. 4 illustrates a waveguide assembly in accordance with the invention having a waveguide transition in accordance with a third variant.
Figure 5:
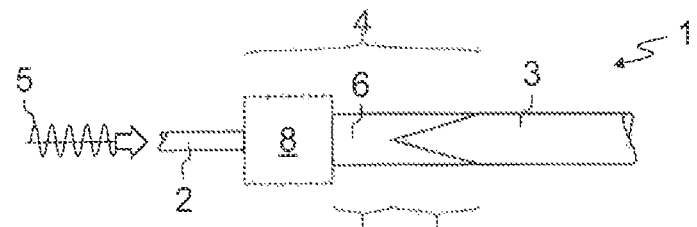
FIG. 5 illustrates a waveguide assembly in accordance with the invention having a waveguide transition in accordance with a fourth variant.

FIG. 3 illustrates a variant of the waveguide piece 6 in which the front section 7 has a reduced permittivity in comparison to the second waveguide 3. The different permittivities are indicated in FIG. 3 by different crosshatchings. The rear section 9 forms a transition between the reduced permittivity of the front section 7 and the permittivity of the second waveguide 3. This can be produced for example by modifying the density of the material and/or combining different materials in the rear section 9 of the waveguide piece 6. In the present case, a stepped transition is illustrated in the rear section 9 of the waveguide piece 6, for example as a result of combining different materials together.

Figure 6:
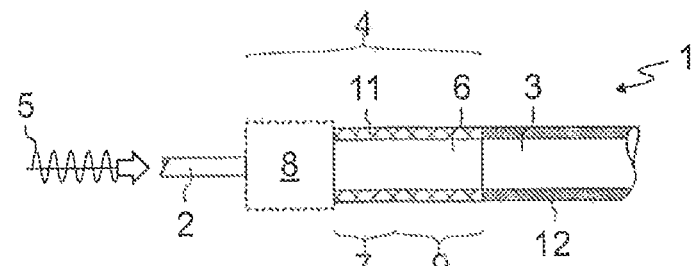
FIG. 6 illustrates a waveguide assembly in accordance with the invention having a waveguide transition in accordance with a fifth variant.

It is also possible to provide that the rear section 9 of the waveguide piece 6 and a front region of the second waveguide 3 are embodied in order to allow their dielectric cores to geometrically merge into one another. This is indicated by way of example in FIGS. 4 and 5. A geometric transition of this type can be advantageous in particular if the permittivities of the dielectric waveguide piece 6, at least of the rear section 9 of the dielectric waveguide piece 6, and of the second waveguide 3 also differ from one another Within the scope of the invention, it is also possible to reduce the number of modes that the dielectric waveguide piece 6 is able to run compared with the second waveguide 3, in that the permittivity of a sheath 11 that encases the dielectric core of the waveguide piece 6 is increased with respect to a sheath of the second waveguide 3. This is illustrated in FIG. 6, wherein the different permittivities are however indicated by different crosshatchings. The second waveguide 3 comprises a sheath 12 that has a lower permittivity than the sheath 11 in the rear section 9 of the dielectric waveguide piece 6.

Figure 7:
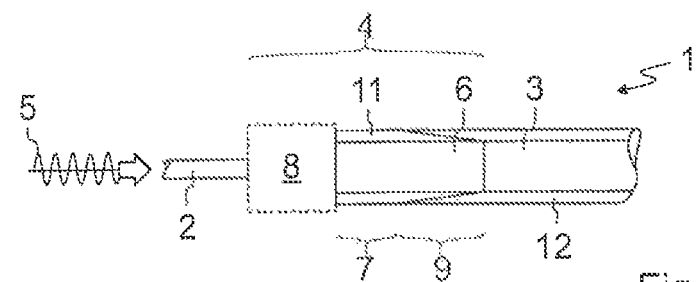
FIG. 7 illustrates a waveguide assembly in accordance with the invention having a waveguide transition in accordance with a sixth variant.
Figure 8:
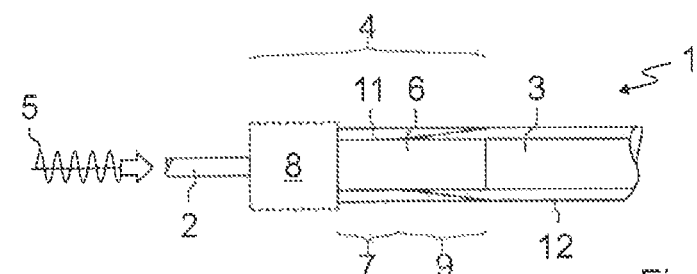
FIG. 8 illustrates a waveguide assembly in accordance with the invention having a waveguide transition in accordance with a seventh variant.

It is also possible to provide that the rear section 9 of the waveguide piece 6 and a front region of the second waveguide 3 are embodied in order to allow their sheaths that encase the dielectric cores to geometrically merge into one another. This is indicated in FIGS. 7 and 8.

The described waveguide assembly 1 can be used advantageously for data transmission at very high data rates at least over average distances. However, the illustrated waveguide assembly 1 is also suitable for use in measurement technology, for example for use in terahertz spectroscopy.

A waveguide assembly (1) is positioned within an electrical data signal transmission system. The electrical data signal transmission system transmits an electromagnetic wave, at a high data rate, to the waveguide assembly (1) which comprises; a first waveguide (2); a second waveguide (3) that is embodied as a dielectric multi-mode waveguide; and; a waveguide transition (4) for transmitting an electromagnetic wave (5) between the first waveguide (2) and the second waveguide (3), the waveguide transition having a dielectric waveguide piece (6) between the first waveguide (2) and the second waveguide (3), and wherein the dielectric waveguide piece (6) is embodied to run a lower number of modes, at least in a front section (7) that is facing the first waveguide, (2) than the second waveguide (3).

A further object of the present invention is a waveguide assembly (1) wherein the dielectric waveguide piece (6) is a purely dielectric waveguide piece (6).

A further object of the present invention is waveguide assembly (1) and wherein characterized in that the front section (7) of the dielectric waveguide piece (6) is a single mode waveguide.

A further object of the present invention is waveguide assembly (1) wherein the front section (7) of the dielectric waveguide piece (6) has a reduced cross-section with respect to the second waveguide; (3), the front section of the dielectric waveguide piece has a reduced permittivity of a dielectric core material with respect to the second waveguide; (3) and/or the front section of the dielectric waveguide piece has an increased permittivity of a sheath (11), which encases the dielectric core material, with respect to the second waveguide (3).

A further object of the present invention is waveguide assembly (1) wherein the dielectric waveguide piece (6) has a rear section (9) that is facing the second waveguide (3) and the rear section of the dielectric waveguide piece forms a transition between different geometries and/or permittivities of the front section (7) of the dielectric waveguide piece (6) and of the second waveguide (3).

A further object of the present invention is waveguide assembly (1) wherein the rear section (9) of the dielectric waveguide piece forms a continuous transition.

A further object of the present invention is waveguide assembly (1) wherein the rear section (9) of the dielectric waveguide piece forms a linear transition, an exponential transition and/or a transition in accordance with a monotone section of a cosine function.

A further object of the present invention is waveguide assembly (1) wherein the rear section of the dielectric waveguide piece (9) forms a stepped transition in the form of steps of a length of an integer multiple of a quarter to a half of a guided wavelength of the electromagnetic wave (5) in the case of a center frequency of a signal that is to be transmitted.

A further object of the present invention is waveguide assembly (1) wherein a transition is formed between different permittivities by modifying/changing a density of a material and/or combining different materials in the rear section (9) of the dielectric waveguide piece (6).

A further object of the present invention is waveguide assembly (1) wherein the rear section (9) of the dielectric waveguide piece, (6) and a front region of the second waveguide, (3) are embodied to allow their respective dielectric cores and/or their respective sheaths (11) that encase their respective dielectric cores to geometrically merge into one another.

A further object of the present invention is waveguide assembly (1) wherein the dielectric waveguide piece (6) is a dielectric hollow conductor.

A further object of the present invention is waveguide assembly (1) and further comprising: a part transition (8) between the first waveguide (2) and the dielectric waveguide piece (6).

A further object of the present invention is waveguide assembly (1) wherein the part transition (8) is a hollow conductor horn, or patch antenna, of an electrical printed circuit board.

A further object of the present invention is waveguide assembly (1) wherein the part transition (8) is one piece with the dielectric waveguide piece (6).

A further object of the present invention is waveguide assembly (1) wherein the first waveguide (2) is at least one of a coaxial cable, a single wire waveguide, a metal or dielectric hollow conductor, or a strip conductor.

A still further object of the present invention is a waveguide transition (4) for a waveguide assembly (1) for transmitting an electromagnetic wave (5) between a first waveguide (2) and a second waveguide, the waveguide transition (3) comprising: a dielectric multi-mode waveguide, that has a dielectric waveguide piece (6) between the first waveguide (2) and the second waveguide; (3), and wherein the dielectric waveguide piece (6) is able to run a lower number of modes, at least in a front section (7) that is facing the first waveguide, (2) than the second waveguide (3).

A still further object of the present invention is a method for transmitting data by means of electromagnetic waves for use in measurement technology, the method comprising the steps: providing a waveguide assembly having, a first waveguide, a second waveguide that is embodied as a dielectric multi-mode waveguide; and a waveguide transition for transmitting the electromagnetic wave between the first waveguide and the second waveguide, the waveguide transition having a dielectric waveguide piece between the first waveguide and the second waveguide, and wherein the dielectric waveguide piece is embodied to run a lower number of modes, at least in a front section that is facing the first waveguide, than the second waveguide; and providing an electromagnetic wave that is communicating data; communicating the provided electromagnetic wave to the waveguide assembly; and using the data transmitted in the electromagnetic wave, and through the waveguide assembly, in terahertz spectroscopy.

A still further object of the present invention is a waveguide assembly wherein the second waveguide is a dielectric hollow conductor.

An even still further object of the present invention is a waveguide assembly wherein the rear section of the dielectric waveguide piece forms a continuous, in sections, transition.

An even still further object of the present invention is a waveguide assembly wherein the rear section of the dielectric waveguide piece forms a discretely stepped transition.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. A waveguide assembly comprising:
   a first waveguide;
   a second waveguide that is embodied as a dielectric multi-mode waveguide; and
   a waveguide transition for transmitting an electromagnetic wave between the first waveguide and the second waveguide, the waveguide transition having a dielectric waveguide piece between the first waveguide and the second waveguide; and wherein
   the dielectric waveguide piece is embodied to run a lesser number of modes, at least in a front section that is facing the first waveguide, than the number of modes that may be run in the second waveguide, and wherein
   in order to reduce the excitation of higher modes in the transition from the first waveguide to the second waveguide, and to enable a multi-mode transmission in the second waveguide without modal dispersion,
   a diameter of the dielectric waveguide piece increases in size starting from the front section of the dielectric waveguide piece to the rear section of the dielectric waveguide piece.

2. The waveguide assembly as claimed in claim 1, and wherein the dielectric waveguide piece is dielectric.

3. The waveguide assembly as claimed in claim 1 and wherein the front section of the dielectric waveguide piece is a single mode waveguide.

4. The waveguide assembly as claimed in claim 1 and wherein the front section of the dielectric waveguide piece has a reduced cross-section with respect to the second waveguide;
   the front section of the dielectric waveguide piece has a reduced permittivity of a dielectric core material than the associated second waveguide; or
   the front section of the dielectric waveguide piece has an increased permittivity of a sheath, which encases the dielectric core material, with respect to the second waveguide.

5. The waveguide assembly as claimed in claim 1 and wherein the dielectric waveguide piece has a rear section that is facing the second waveguide and the rear section of the dielectric waveguide piece forms a transition between different geometries and/or permittivities of the front section of the dielectric waveguide piece and of the second waveguide.

6. The waveguide assembly as claimed in claim 5, and wherein the rear section of the dielectric waveguide piece forms a continuous transition.

7. The waveguide assembly as claimed in claim 6, and wherein the rear section of the dielectric waveguide piece forms a linear transition, an exponential transition and/or a transition in accordance with a monotone section of a cosine function.

8. The waveguide assembly as claimed in claim 5, and wherein the rear section of the dielectric waveguide piece forms a stepped transition in the form of steps of a length of an integer multiple of a quarter to a half of a guided wavelength of the electromagnetic wave in the case of a center frequency of a signal that is to be transmitted.

9. The waveguide assembly as claimed in claim 5 and wherein the transition is formed between different permittivities by modifying a density of a material or by combining different materials in the rear section of the dielectric waveguide piece.

10. The waveguide assembly as claimed in claim 5 and wherein the rear section of the dielectric waveguide piece, and a front region of the second waveguide each having a respective dielectric core or a respective sheath that encases the corresponding dielectric core; and
   the rear section of the dielectric waveguide niece, and a front region of the second waveguide, are embodied to allow their respective dielectric cores and/or their respective sheaths that encase the respective dielectric cores to geometrically merge into one another.

11. The waveguide assembly as claimed in claim 5, and wherein the rear section of the dielectric waveguide piece forms a continuous, or in sections, transition.

12. The waveguide assembly as claimed in claim 5, and wherein the rear section of the dielectric waveguide piece forms a discretely stepped transition.

13. The waveguide assembly as claimed in claim 1 and wherein the second waveguide is a dielectric hollow conductor.

14. The waveguide assembly as claimed in claim 1 and wherein the dielectric waveguide piece is at least partially hollow.

15. The waveguide assembly as claimed in claim 1 and wherein the first waveguide is at least one of a coaxial cable, a single wire waveguide, a metal or dielectric hollow conductor, or a strip conductor.

16. The waveguide assembly as claimed in claim 1 and further comprising:
   a part transition between the first waveguide and the dielectric waveguide piece.

17. The waveguide assembly as claimed in claim 16, and wherein the part transition is a hollow conductor horn, or patch antenna of an electrical printed circuit board.

18. The waveguide assembly as claimed in claim 16 and wherein the part transition is one piece with the dielectric waveguide piece.

19. A waveguide transition for a waveguide assembly for transmitting an electromagnetic wave between a first waveguide and a second waveguide, the waveguide transition comprising:
   a dielectric multi-mode waveguide, that has a dielectric waveguide piece between the first waveguide and the second waveguide; and
      wherein the dielectric waveguide piece is able to run a lesser number of modes, at least in a front section that is facing the first waveguide, than the number of modes that may be run in the second waveguide, and wherein
   in order to reduce the excitation of higher modes in the transition from the first waveguide to the second waveguide, and to enable a multi-mode transmission in the second waveguide without modal dispersion,
   a diameter of the dielectric waveguide piece increases in size starting from the front section of the dielectric waveguide piece to the rear section of the dielectric waveguide piece.

20. A waveguide transition for a waveguide assembly for transmitting an electromagnetic wave between a first waveguide and a second waveguide, the waveguide transition comprising:
   a dielectric multi-mode waveguide, that has a dielectric waveguide piece between the first waveguide and the second waveguide; and wherein
   the dielectric waveguide piece is able to run a lesser number of modes, at least in a front section that is facing the first waveguide, than the number of modes that may be run in the second waveguide, and wherein
   in order to reduce the excitation of higher modes in the transition from the first waveguide to the second waveguide, and to enable a multi-mode transmission in the second waveguide without modal dispersion,
      the front section of the dielectric waveguide piece has a reduced cross-section with respect to the second waveguide;
   the front section of the dielectric waveguide has a reduced permittivity of a dielectric core material with respect to the second waveguide, and/or
   the front section of the dielectric waveguide piece has an increased permittivity of a sheath, which encases the dielectric core material, with respect to the second waveguide.

21. A waveguide assembly comprising:
   a first waveguide;
   a second waveguide that is embodied as a dielectric multi-mode waveguide; and
   a waveguide transition for transmitting an electromagnetic wave between the first waveguide and the second waveguide, the waveguide transition having a dielectric waveguide piece between the first waveguide and the second waveguide; and wherein
      the dielectric waveguide piece is embodied to run a lesser number of modes, at least in a front section that is facing the first waveguide, than the number of modes that may be run in the second waveguide, and wherein
   in order to reduce the excitation of higher modes in the transition from the first waveguide to the second waveguide, and to enable a multi-mode transmission in the second waveguide without modal dispersion,
   the front section of the dielectric waveguide piece has a reduced cross-section with respect to the second waveguide;
   the front section of the dielectric waveguide has a reduced permittivity of a dielectric core material with respect to the second waveguide, and/or
   the front section of the dielectric waveguide piece has an increased permittivity of a sheath, which encases the dielectric core material, with respect to the second waveguide.

* * * * *